June 10, 1958 H. R. COLLINS 2,838,327
TRAILER HITCH OF THE RETRACTIBLE TYPE
Filed Oct. 6, 1955 2 Sheets-Sheet 1
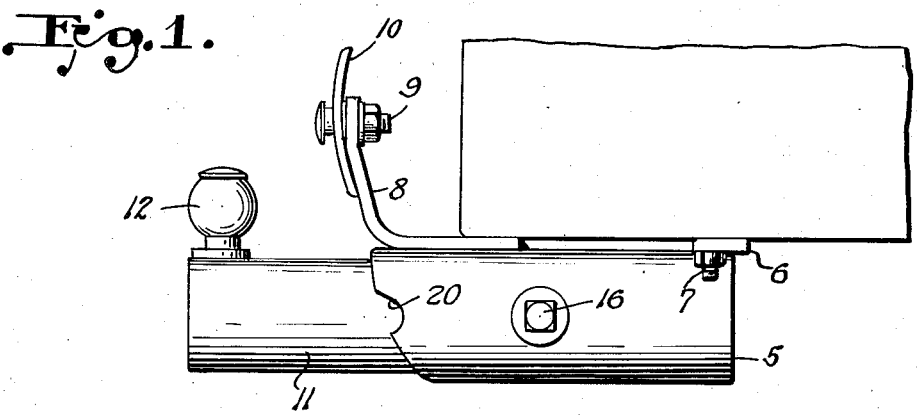
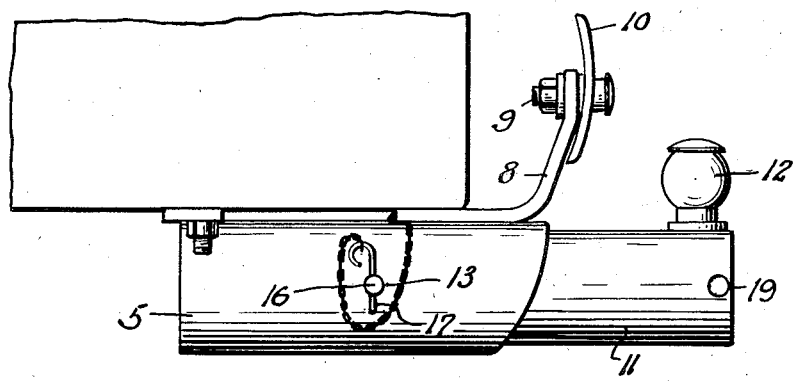
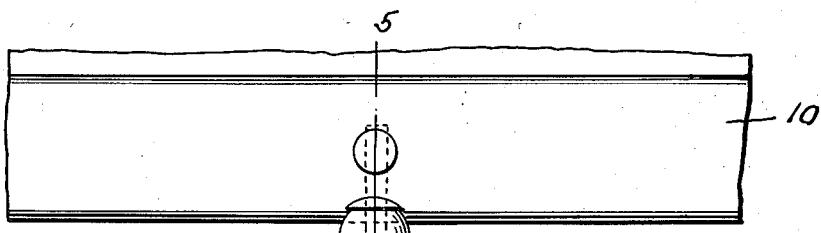
Horace R. Collins
INVENTOR
BY
ATTORNEYS.

June 10, 1958     H. R. COLLINS     2,838,327
TRAILER HITCH OF THE RETRACTIBLE TYPE
Filed Oct. 6, 1955     2 Sheets-Sheet 2

Horace R. Collins
INVENTOR
BY
ATTORNEYS.

United States Patent Office 2,838,327
Patented June 10, 1958

2,838,327

TRAILER HITCH OF THE RETRACTIBLE TYPE

Horace R. Collins, Elroy, Wis.

Application October 6, 1955, Serial No. 538,890

1 Claim. (Cl. 280—491)

This invention relates to trailer hitch construction, designed for hitching trailers to tractors or similar towing medium.

An important object of the invention is to provide a trailer hitch bar which, when out of use, will be supported in such a manner that the ball-headed bolt to which the socket section of the conventional hitch is connected, may be given a quarter turn where it projects laterally to a position where it will not obscure the usual license plate of the towing vehicle.

Another important object of the invention is to provide a hitch bar which may be telescoped and the length of the hitch bar shortened substantially so that the hitch bar will lie within the confines of the bumper, to meet State law requirements.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawings:

Figure 1 is a side elevational view of a trailer hitch constructed in accordance with the invention, the hitch bar being extended for connection with a trailer.

Figure 2 is an elevational view illustrating the opposite side of the trailer hitch.

Figure 3 is an end elevational view of the trailer hitch in a position to receive the socket section of the hitch.

Figure 4:
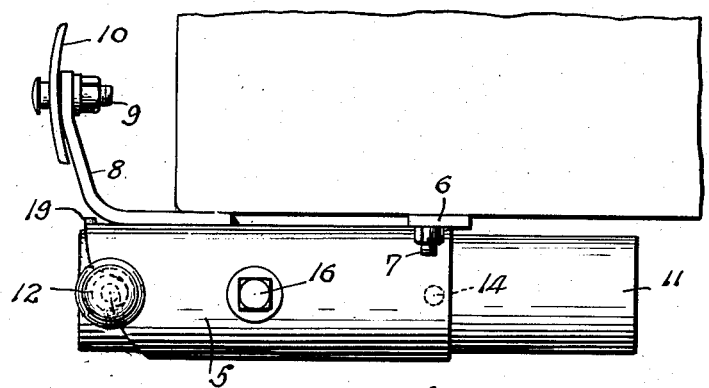
Figure 4 is a side elevation view illustrating the hitch bar as retracted to its inactive position with the ball-headed bolt as extended laterally from the tubular housing of the hitch.

Referring to the drawings in detail, the hitch comprises a tubular housing 5 to which is welded a transverse bar or bracket member 6 disposed at the rear end thereof, the bar or bracket member 6 having openings to receive bolts 7 by means of which the rear end of the tubular housing is firmly secured to the trailer to which the invention is attached.

Extending forwardly from the tubular housing 5, is a bracket arm 8 which is formed with an opening to receive a bolt 9 that extends through an opening formed in the bumper 10, rigidly securing the forward end of the tubular housing to the bumper of the tractor.

The hitch also comprises a hitch bar 11 that telescopes within the tubular housing 5, the forward edge of the tubular housing 5 being curved as better shown by Figure 2 of the drawing, so that the headed bolt 12 which contacts the front edge of the tubular housing 5 will lie in a plane slightly at the rear of the bumper 10 of the tractor when out of use.

The tubular housing 5 is formed with an opening 13 that is adapted to register with openings 14, or 15 formed in the hitch bar 11 so that a spring biased bolt such as indicated by the reference character 16 may extend therethrough, securing the hitch bar within the tubular housing, in either its extended or retracted positions. The cotter key indicated at 17 is passed through an opening in one end of the bolt 16 to hold the bolt in position.

Figure 5:
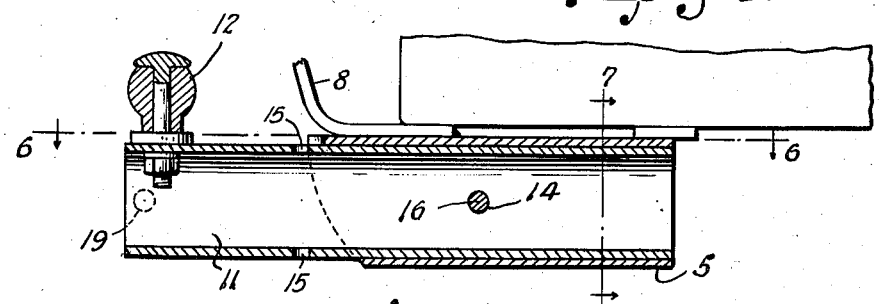
Figure 5 is a longitudinal sectional view through the hitch in its extended position.
Figure 6:
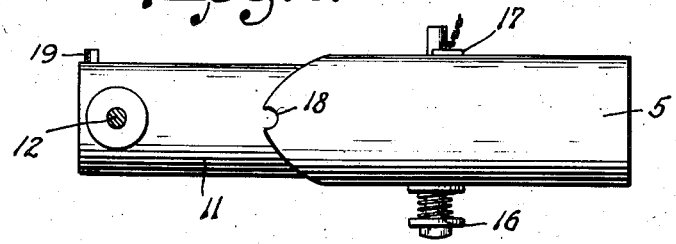
Figure 6 is a plan view thereof.
Figure 7:
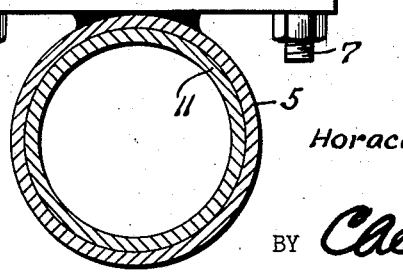
Figure 7 is a sectional view taken on line 7—7 of Figure 5.

As better shown by Figures 5 and 6 of the drawings, the tubular housing is provided with a notch 18 extending inwardly from one edge thereof, the notch being designed to receive a pin 19 that extends laterally from the side of the hitch bar 11, to hold the hitch bar in a position wherein the opening 15 of the hitch bar will register with the opening 13 of the tubular housing, to receive the bolt 16 that holds the hitch bar in its adjusted position within the tubular housing.

The tubular housing is also provided with a notch 20 formed in the curved edge thereof, the notch being designed to receive pin 19 when the hitch bar is moved to its retracted position, thereby guiding the hitch bar rearwardly so that the openings 15 will align with the aligning openings of said housing to receive the retaining bolt 16 normally holding the hitch bar in its retracted position.

From the foregoing it will be seen that when the hitch bar is out of use, the hitch bar 11 will be retracted in the tubular housing 5 and the bolt 16 positioned within the registering openings of the tubular housing and hitch bar, to secure the hitch bar in its inactive position.

When it is desired to use the hitch, the bolt is removed from the position as shown by Figure 4 of the drawing, and the hitch bar 11 extended to the position as shown by Figure 5. The bolt 16 is now inserted in the registering openings of the tubular housing and hitch bar, to hold the hitch bar 11 extended so that the socket member of the hitch bar carried by the trailer, may be positioned over the ball-headed bolt 12.

Having thus described the invention, what is claimed is:

A tractor hitch comprising a tubular housing open at each end thereof, a transverse supporting bar fixed to the forward end of said housing and adapted for attachment to a vehicle adjacent to the rear bumper thereof, a bracket arm extending upwardly and rearwardly from said housing adapted to be attached to the bumper of the vehicle, the rear end of said tubular housing terminating below the lower edge of the vehicle bumper, the rear edge of said housing being curved downwardly and forwardly, and having a pair of spaced-apart guide recesses formed in the rear curved edge thereof, one of said recesses being disposed adjacent to the top of said housing, the other recess being formed at one side of said housing, a hitch member including a tubular slide engaging in said housing, a hitch secured to the rear of said slide, adapted to move over said curved edge and moved into said other recess of said housing holding said tubular slide against rotation in said housing, said slide having aligned pairs of openings therethrough, said housing having a pair of aligned openings, a bolt engaging through a selected pair of said first named openings and through said second named pair of openings, a spring constantly biasing said bolt to disengaged position, a pin extending transversely through said bolt for locking the latter with said hitch member in either extended or retracted position, a chain connected to said pin and said housing, and a positioning pin carried by said slide engageable in one of said recesses when the slide is retracted into said housing to thereby dispose one pair of said slide openings in registry with said opening in said housing.

References Cited in the file of this patent

UNITED STATES PATENTS

| | | |
|---|---|---|
| 2,544,185 | Sargent | Mar. 6, 1951 |
| 2,667,366 | Otjen | Jan. 26, 1954 |
| 2,671,674 | Derksen | Mar. 9, 1954 |
| 2,685,468 | Blocker et al. | Aug. 3, 1954 |